(12) United States Patent
Takekawa

(10) Patent No.: US 12,114,248 B2
(45) Date of Patent: Oct. 8, 2024

(54) RADIO COMMUNICATION SYSTEM AND RADIO COMMUNICATION METHOD

(71) Applicant: HITACHI KOKUSAI ELECTRIC INC., Tokyo (JP)

(72) Inventor: Masayuki Takekawa, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 18/260,416

(22) PCT Filed: Jan. 10, 2021

(86) PCT No.: PCT/JP2021/001768
§ 371 (c)(1),
(2) Date: Jul. 5, 2023

(87) PCT Pub. No.: WO2022/157843
PCT Pub. Date: Jul. 28, 2022

(65) Prior Publication Data
US 2024/0073776 A1    Feb. 29, 2024

(51) Int. Cl.
*H04W 40/12*    (2009.01)
*H04W 40/22*    (2009.01)

(52) U.S. Cl.
CPC ........... *H04W 40/12* (2013.01); *H04W 40/22* (2013.01)

(58) Field of Classification Search
None
See application file for complete search history.

(56) References Cited

U.S. PATENT DOCUMENTS

| | | | |
|---|---|---|---|
| 11,503,530 B2* | 11/2022 | Arngren | H04L 45/122 |
| 2011/0317560 A1 | 12/2011 | Aramoto et al. | |
| 2017/0347285 A1* | 11/2017 | Luo | H04W 28/021 |
| 2018/0242163 A1* | 8/2018 | Patel | H04W 48/10 |
| 2019/0246429 A1 | 8/2019 | Takinami et al. | |
| 2024/0114430 A1* | 4/2024 | Xu | H04W 40/12 |

FOREIGN PATENT DOCUMENTS

| | | |
|---|---|---|
| JP | 2013-225949 A | 10/2013 |
| JP | 2019-140465 A | 8/2019 |
| JP | 2019-169848 A | 10/2019 |
| WO | 2017-018021 A1 | 2/2017 |

OTHER PUBLICATIONS

International Search Report dated Apr. 13, 2021.

\* cited by examiner

*Primary Examiner* — Brian S Roberts
(74) *Attorney, Agent, or Firm* — BACON&THOMAS, PLLC

(57) ABSTRACT

There is provided a radio communication system comprising: a plurality of movable bodies that support route diversity transmission using a plurality of radio communication lines for data transmission; and an integration controller configured to collect line states of the radio communication lines for each of the plurality of movable bodies. The integration controller is configured to transmit a control signal of the radio communication line to a particular unmanned movable body so as to increase the number of unmanned movable bodies in which the number of radio communication lines whose line states satisfy a quality determination criterion is greater than or equal to a predetermined value, based on the line states of the radio communication lines collected for each of the plurality of movable bodies.

4 Claims, 5 Drawing Sheets

RADIO COMMUNICATION SYSTEM AND RADIO COMMUNICATION METHOD

TECHNICAL FIELD

The present disclosure relates to a radio communication system capable of simultaneously operating a plurality of movable bodies corresponding to route diversity transmission using a plurality of radio communication lines for data transmission.

BACKGROUND

Recent advances in robot technology are remarkable, and robots are widely used for addressing various social issues. Such robots are mostly unmanned movable bodies such as unmanned aerial vehicles, autonomous vehicles, and the like. An unmanned movable body requires a communication system to transmit control instruction data for remote control or autonomous control, or video data captured by a camera attached to the unmanned movable body. When the unmanned movable body is not a machine that moves in a predetermined route along a rail or the like, radio communication suitable for movement is often used.

For example, Patent Document 1 discloses an invention in which a movable base station and a terminal station have a long-distance communication function for preparing short-distance communication and a short-distance communication function for data transmission, and the timing of performing short-distance communication is scheduled by communication using the long-distance communication function. In addition, Patent Document 2 discloses an invention in which a relay location of an unmanned flying object is searched based on the communication quality of the relay, the scheduled relay time, and the power supply state (the amount of power that can be supplied) of the unmanned flying object in a relay system using the unmanned flying object.

PRIOR ART DOCUMENTS

Patent Documents

Patent Document 1: International Publication No. 2017/018021
Patent Document 2: Japanese Laid-open Patent Publication No. 2019-169848

SUMMARY

Problems to be Resolved by the Invention

In radio communication with an unmanned movable body, a radio communication system using a frequency band that does not require a license, such as an industrial, scientific, and medical (ISM) band or the like, is often adopted. However, in an environment where many users exist, there is a high risk of communication failure due to interference or the like. In consideration of such a situation, the institutionalization and operation of an unmanned movable image transmission system or the like are being adjusted for a radio station for robots. Further, there is a demand for even higher reliability of a radio communication system for the safe use and utilization of robots.

A route diversity transmission technology using redundancy transmission is one of the highly reliable communication technologies. In the route diversity transmission technology, the same data is transmitted between a data transmission side and a data reception side using a plurality of communication paths, and the information transmitted from the communication paths is integrated on the data reception side. Accordingly, it is possible to improve the reachability of data by utilizing various changes in the line quality of the communication systems forming each communication path.

In the route diversity transmission technology, communication data is transmitted using a plurality of communication systems that are highly likely to have different line qualities. In this case, even if the line quality of one communication system deteriorates and it is difficult to deliver the data, the data can be delivered via another communication system. Therefore, by installing mobile station radio equipment of multiple radio systems in unmanned movable body such as a drone or the like and applying the route diversity transmission technology using multiple radio communication lines, it is possible to improve the reachability of control command data or video data. In this method, the same communication data is sent to multiple radio communication lines that are available to the transmission side radio station at a given time, so that it is expected that the communication data will reach the reception side through at least one of the radio communication lines.

Recently, a method for determining a frequency channel to be used by mobile station radio equipment of a radio system mounted on an unmanned movable body such as a drone or the like has been studied. For example, there is proposed a method for preparing a frequency usage plan during an operation of a drone in advance by combining a flight plan (planned flight route) of the drone and radio environment information (radio environment database) at each point on the flight route (Academic publication: 2020 University of IEICE B-2-3 "Research and development of radio wave utilization technology for avoiding crosstalk and interference in small unmanned aircraft—Proposal of UAV BVLOS flight support communication system using radio environment database—").

When each mobile station is connected to a radio network that is considered to be optimal based on the above-described frequency usage plan information, the same frequency channel is recommended by the radio environment database in the same airspace. As a result, when the number of drones in the same airspace increases, a large number of mobile stations share the same frequency channel, and the communication speed may decrease on congested channels.

In this regard, some radio communication systems have a radio resource management function, and perform optimal resource allocation in consideration of the usage status of frequency resources in the system. However, it was common to perform resource allocation in radio networks managed by the same operator. Therefore, when there are multiple radio networks that can be used in the same frequency band and the operators of these radio networks are different, it is difficult to perform optimal control in consideration of the overall utilization of frequency resources.

The present disclosure has been made in view of the conventional circumstances described above, and has an object of enabling a large number of movable bodies to perform highly efficient and reliable radio communication even when a plurality of movable bodies exist in the same area in a radio communication system using a route diversity transmission technology.

Means for Solving the Problems

In order to achieve the above-described object, in the present disclosure, a radio communication system is configured as follows.

A radio communication system according to the present disclosure comprises a plurality of movable bodies that support route diversity transmission using a plurality of radio communication lines for data transmission; and an integration controller configured to collect line states of the radio communication lines for each of the plurality of movable bodies, wherein the integration controller is configured to transmit a control signal of the radio communication line to a particular unmanned movable body so as to increase the number of unmanned movable bodies in which the number of radio communication lines whose line states satisfy a quality determination criterion is greater than or equal to a predetermined value, based on the line states of the radio communication lines collected for each of the plurality of movable bodies.

The particular movable body may be a movable body using the same radio communication line as a movable body, in which the number of radio communication lines whose line states satisfy the quality determination criterion is smaller than the predetermined value, among movable bodies in which the number of radio communication lines whose line states satisfy the quality determination criterion exceeds the predetermined value.

Further, the integration controller may be configured to transmit a control signal that instructs disconnection of a radio communication line whose line state does not satisfy the quality determination criterion to the particular movable body.

Further, the integration controller may be configured to transmit a control signal that instructs a change of a connection target base station for at least one of the radio communication lines whose line states satisfy the quality determination criterion to the particular movable body.

Effect of the Invention

In accordance with the present disclosure, in a radio communication system using a route diversity transmission technology, even when a plurality of movable bodies exist in the same area, a large number of movable bodies can perform highly efficient and reliable radio communication.

DETAILED DESCRIPTION

Hereinafter, one embodiment of the present disclosure will be described in detail with reference to the accompanying drawings.

(Outline of Radio Communication System)

Figure 1:
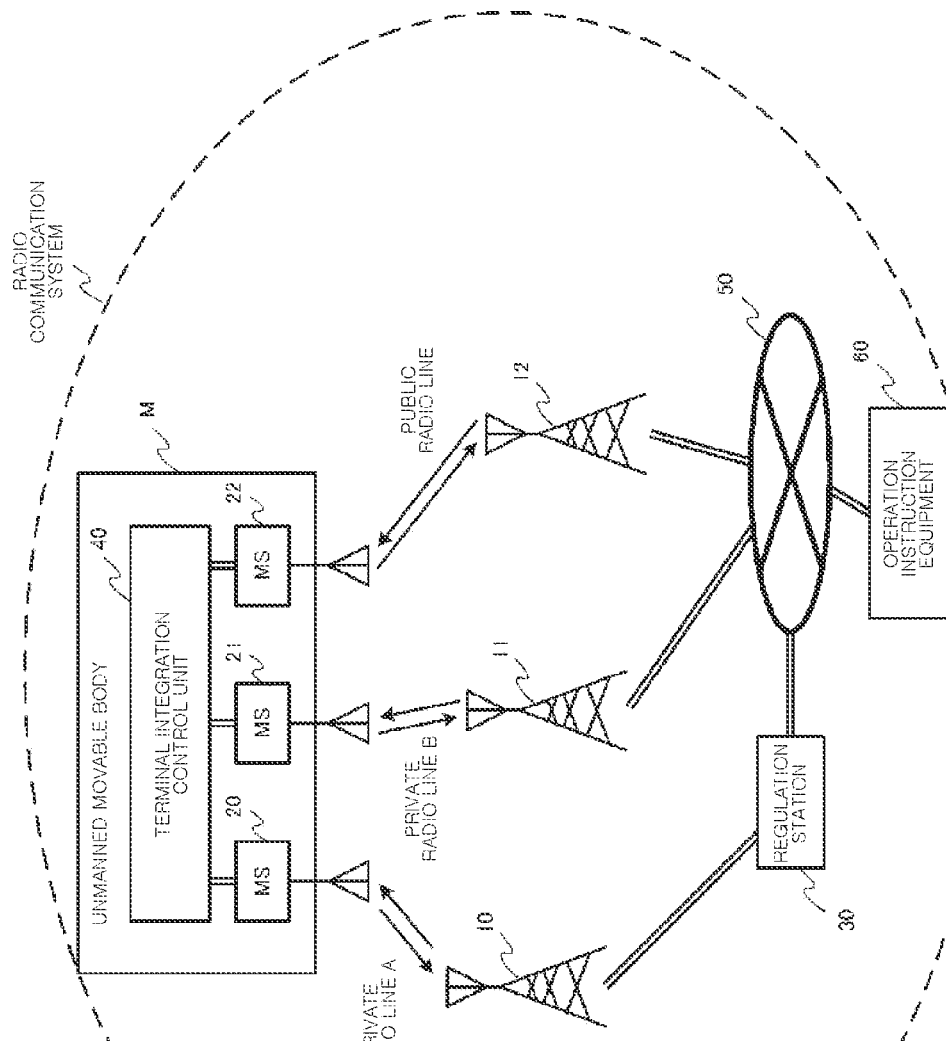
FIG. 1 shows a schematic configuration of a radio communication system according to one embodiment of the present disclosure.

FIG. 1 shows a schematic configuration of a radio communication system according to one embodiment of the present disclosure. The radio communication system shown in FIG. 1 includes an unmanned movable body M, base stations BS 10 to 12, mobile stations MS 20 to 22, a regulation station 30, a terminal integration control unit 40, an Internet section 50, and an operation instruction equipment 60. The radio communication system of this example uses route diversity transport for transmission of communication data between the unmanned movable body M and the regulation station 30.

The MS 20 to 22 are mobile stations mounted on the unmanned movable body M equipped with an autonomous moving device such as an unmanned aircraft, an autonomous driving vehicle, or the like. For example, radio communication terminals such as slave stations and mobile phones are used. The BS 10 to 12 are base stations connected to the mobile stations MS 20 to 22. The regulation station 30 manages an unmanned movable body or multiple radio communication lines connected to the system. The terminal integration control unit 40 is mounted on the unmanned movable body M together with the MS 20 to 22, and controls the MS 20 to 22. The operation instruction equipment 60 remotely controls the flight of the unmanned movable body M by radio communication via the regulation station 30.

The radio communication between the BS 10 and the MS 20 is performed by a communication method in which uplink communication (uplink) and downlink communication (downlink) are performed on the same frequency. The radio communication between the BS 11 and the MS 21 and between the BS 12 and the MS 22 are performed in the same manner. The BS 10 is the base station of a private radio line A. The BS 11 is the base station of a private radio line B. The BS 12 is the base station of a public radio line. The frequencies used by the private radio line A, the private radio line B, and the public radio line are different from each other. Although one base station is installed for one radio communication line in FIG. 1, it is general that a plurality of base stations are installed for one radio communication line. The BS 10 to BS 12 are connected to the regulation station 30 via a network so that they can communicate. The network that connects the BS 11 and the BS 12 and the regulation station 30 also includes the Internet section 50.

(Specific Configuration of BS 10 to 12)

Figure 2:
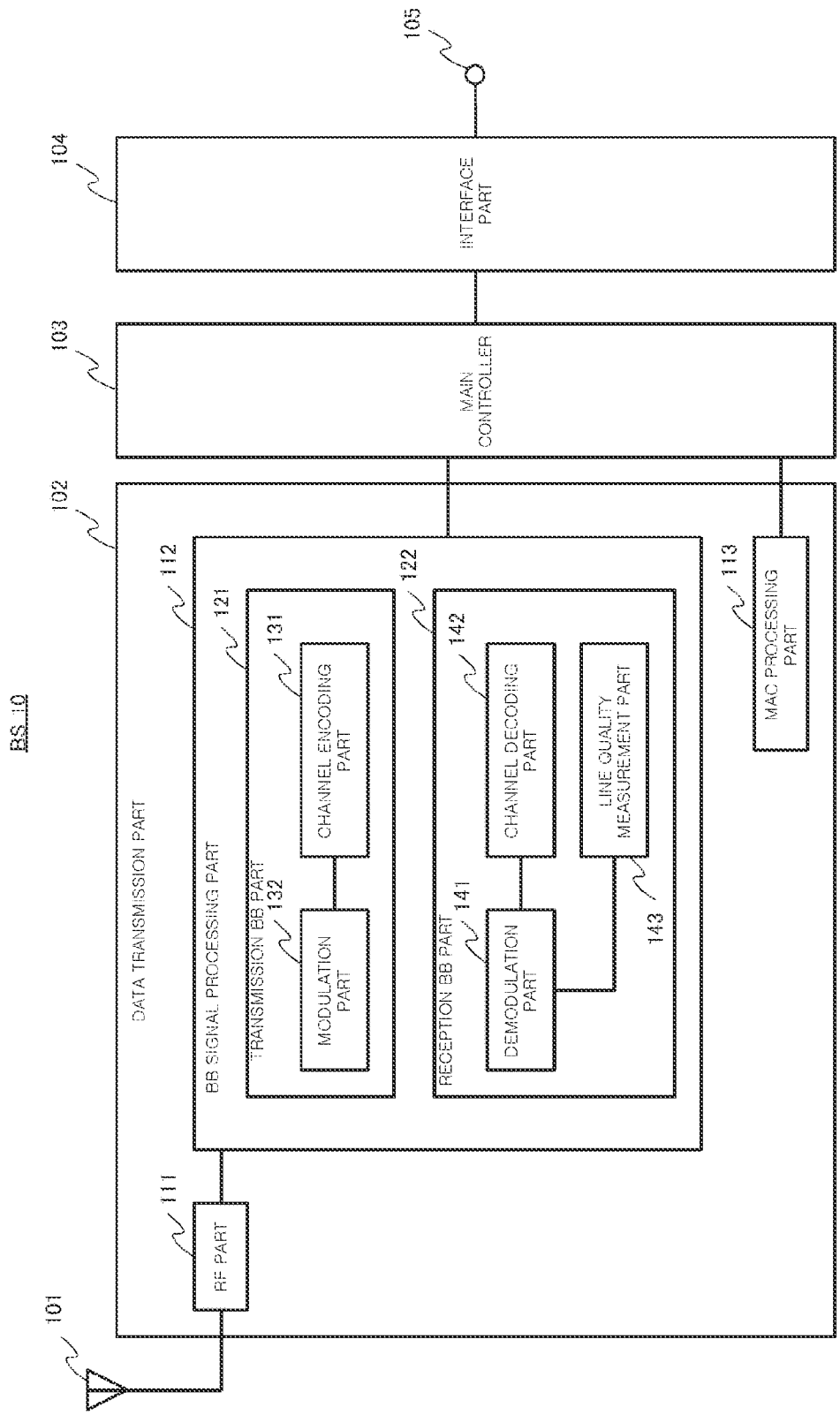
FIG. 2 shows a configuration example of a base station in the radio communication system of FIG. 1.

Hereinafter, the configuration of the BS 10 will be described with reference to FIG. 2. Since BS 11 and BS 12 have the same configuration as that of BS 10, the description thereof will be omitted.

The BS 10 includes an antenna 101, a data transmission part 102, a main controller 103, an interface part 104, and a terminal 105. The antenna 101 is used for transmitting and receiving radio waves. The data transmission part 102 performs data transmission and data reception. The main controller 103 controls the entire host station. The interface part 104 is an interface with an external line or an external device. The terminal 105 is used for connection with an external line or an external device.

The data transmission part 102 includes a radio frequency (RF) part 111, a baseband (BB) signal processing part 112, and a medium access control (MAC) processing part 113.

The RF part 111 performs processing such as frequency conversion from a baseband to a radio frequency band, frequency conversion from a radio frequency band to a baseband, signal amplification, or the like.

The BB signal processing part 112 includes a transmission BB part 121 and a reception BB part 122. The transmission BB part 121 includes a channel coding part 131 for performing channel coding and a modulation part 132 for performing modulation. The reception BB part 122 includes a demodulation part 141 for performing demodulation, a channel decoding part 142 for performing channel decoding, and a channel quality measurement part 143 for measuring the quality of the radio communication channel. The channel quality measurement part 143 measures, for example, a received signal strength indicator (RSSI) and a carrier-to-interference and noise power ratio (CINR), as the quality of the radio communication channel connected to the host station, and reports the measurement result to the main controller 103.

The MAC processing part 113 performs processing such as the control of the frequency channel used by the host station or the data transmission/reception timing, the addition of the host station identifier to a communication packet, the detection of an error in a received packet, the recognition of a radio device of a data transmission source, or the like.

The main controller 103 may include, for example, a processor, a data storage area defined on a memory, and software. Further, the processing in the BB signal processing part 112 and the MAC processing part 113 can be performed by reading out a program stored in a data storage device such as a hard disk, a flash memory, or the like on a memory and executing the program under the control of the processor of the main controller 103, for example.

(Specific Configuration of MS 20 to 22)

Figure 3:
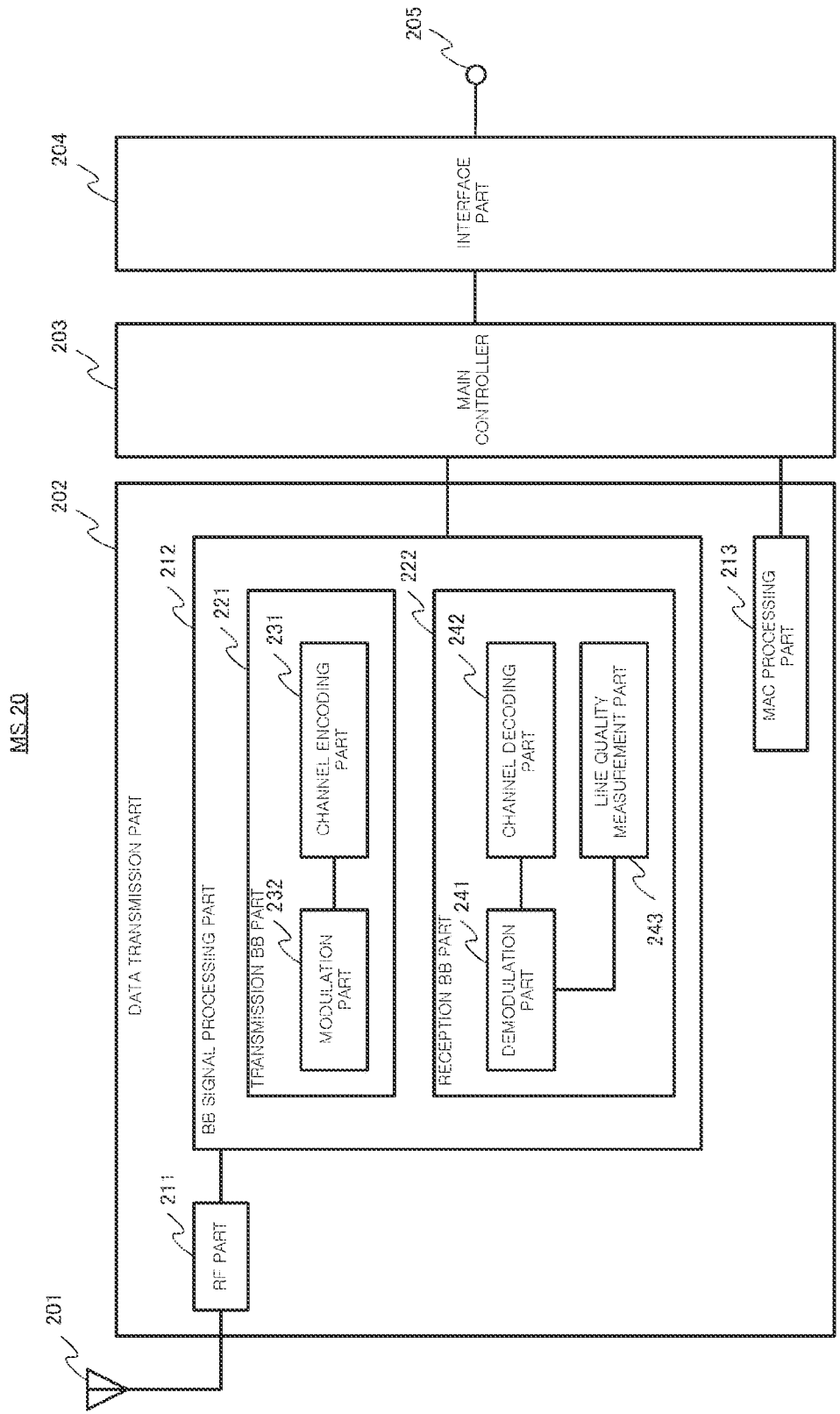
FIG. 3 shows a configuration example of a mobile station in the radio communication system of FIG. 1.

Hereinafter, the configuration of the MS 20 will be described with reference to FIG. 3. Since the MS 21 and the MS 22 have the same configuration as that of the MS 20, the description thereof will be omitted.

The MS 20 includes an antenna 201, a data transmission part 202, a main controller 203, an interface part 204, and a terminal 205. The antenna 201 is used for transmitting and receiving radio waves. The data transmission part 202 performs data transmission and data reception. The main controller 203 controls the entire host station. The interface part 204 is an interface with an external line or an external device. The terminal 205 is used for connection with an external line or an external device.

The data transmission part 202 includes an RF part 211, a baseband (BB) signal processing part 212, and an MAC processing part 213.

The RF part 211 performs processing such as frequency conversion from the baseband to the radio frequency band, frequency conversion from the radio frequency band to the baseband, signal amplification, or the like.

The BB signal processing part 212 includes a transmission BB part 221 and a reception BB part 222. The transmission BB part 221 includes a channel coding part 231 for performing channel coding, and a modulation part 232 for performing modulation processing. The reception BB part 222 includes a demodulation part 241 for performing demodulation, a channel decoding part 242 for performing channel decoding, and a channel quality measurement part 243 for measuring the quality of the radio communication channel. The channel quality measurement part 243 measures, for example, RSSI and CINR, as the quality of the radio communication channel connected to the host station, and reports the measurement result to main controller 103.

The MAC processing part 213 performs processing such as the control of the frequency channel used by the host station or the data transmission/reception timing, the addition of the host station identifier to the communication packet, the detection of an error in the received packet, the recognition of the radio device of the data transmission source, or the like.

The main controller 203 may include, for example, a processor, a data storage area defined on a memory, and software. Further, the processing in the BB signal processing part 212 and the MAC processing part 213 can be performed by reading out the program stored in the data storage device such as a hard disk, a flash memory, or the like on the memory and executing the program under the control of the processor of the main controller 203, for example.

(Specific Configuration of Regulation Station 30)

Figure 4:
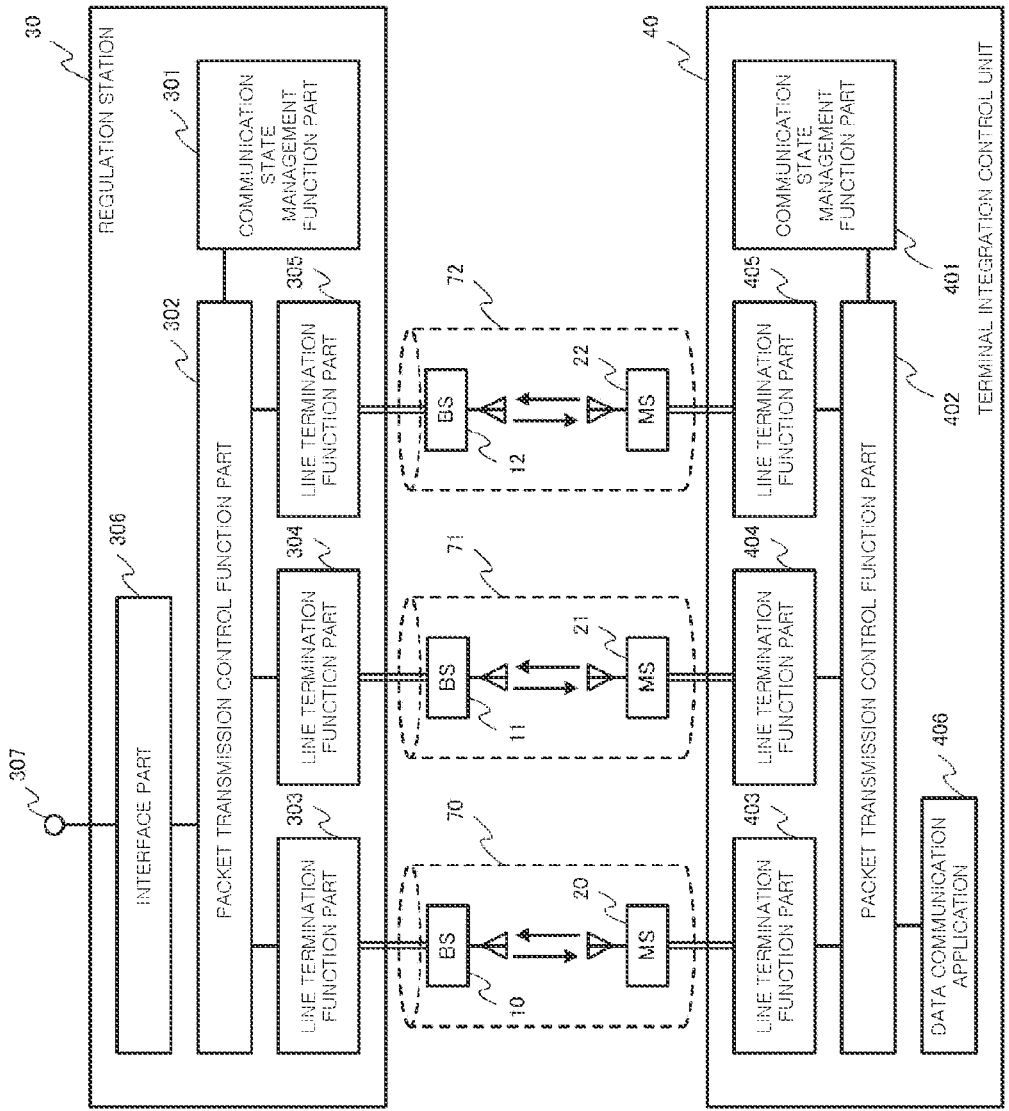
FIG. 4 shows a configuration example of a regulation station and a terminal general control unit in the radio communication system of FIG. 1.

Hereinafter, the configuration of the regulation station 30 will be described with reference to FIG. 4.

The regulation station 30 includes a communication state management function part 301, a packet transfer control function part 302, line termination function parts 303 to 305, an interface part 306, and a terminal 307.

The communication state management function part 301 manages the connection states of radio communication lines between the MS 20 to 22 mounted on the unmanned movable body M and the BS 10 to 12, and the system participation status of the unmanned movable body M. The packet transfer control function part 302 controls the transfer and integration of communication data packets transmitted using a plurality of radio communication lines, and relays the communication between the BS 10 to 12 and the Internet section 50 and the operation instruction equipment 60. The line termination function parts 303 to 305 controls data transmission of each radio communication line or tracks changes in IP addresses of MS 20 to 22. The interface part 306 is an interface with an external line or an external device. The terminal 307 is used for connection with an external line or an external device.

The line termination function part 303 is connected to the BS 10, and terminates the private radio line A. The line termination function part 304 is connected to the BS 11, and terminates the private radio line B. The line termination function part 305 is connected to the BS 12, and terminates the public radio line. Further, the line termination function parts 303 to 305 measure the number of transmitted/received packets, the amount of transmitted/received data, and the transmission delay time based on the communication data transmitted/received through the radio lines.

(Specific Configuration of Terminal Integrated Control Unit 40)

Hereinafter, the configuration of the terminal integrated control unit 40 mounted on the unmanned movable body M will be described with reference to FIG. 4.

The terminal integration control unit 40 includes a communication state management function part 401, a packet transfer control function part 402, line termination function parts 403 to 405, and a data communication application 406.

The communication state management function part 401 manages the connection states of radio communication lines between the MS 20 to 22 and the BS 10 to 12, and the system participation status of its own device (unmanned movable body). The packet transfer control function part 402 controls the transmission and integration of the communication data packets transmitted using a plurality of radio communication lines. The line termination function parts 403 to 405 controls data transmission of each radio communication line or tracks changes in the IP addresses of the MS 20 to 22. The data communication application 406 is an application for performing data communication between the Internet section 50 and the operation instruction equipment 60.

The line termination function part 403 is connected to the MS 20, and terminates the private radio line A. The line termination function part 404 is connected to the MS 21, and terminates the private radio line B. The line termination function part 405 is connected to the MS 22, and terminates the public radio line. Further, the line termination function parts 403 to 405 measure the number of transmitted/received packets, the amount of transmitted/received data, and the transmission delay time based on the communication data transmitted/received through the radio lines.

(Construction of Communication Path Between Terminal Integration Control Unit 40 and Regulation Station 30 and Connection Management)

Hereinafter, the construction of a tunnel between the regulation station 30 and the terminal integrated control unit 40 will be described with reference to FIG. 4. Here, the tunnel is a closed virtual direct line that connects two points on a communication network.

The line termination function part 403 performs tunneling with the line termination function part 303 via the MS 20 and the BS 10 to construct a private radio line A tunnel 70. The line termination function part 404 performs tunneling with the line termination function part 304 via the MS 21, the BS 11, and the Internet section 50, to construct a private radio line B tunnel 71. The line termination function part 405 performs tunneling with the line termination function part 303 via the MS 22, the BS 12, and the Internet section 50, to construct a public radio line tunnel 72.

The communication state management function part 401 of the terminal integration control unit 40 transmits a connection request message to the communication state management function part 301 of the regulation station 30 when the construction of any one of the tunnels 70 to 72 is completed. The communication state management function part 301 that has received the connection request message transmits a connection permission message to the communication state management function part 401. Accordingly, a communication session between the regulation station 30 and the terminal integration control unit 40 is established.

(Quality Management of Radio Communication Line Between Terminal Integrated Control Unit 40 and Regulation Station 30)

Hereinafter, the line state management function of the terminal integrated control unit 40 and the regulation station 30 will be described with reference to FIG. 4. Here, it is assumed that the communication session has been established between the regulation station 30 and the terminal integration control unit 40.

The communication state management function part 401 of the terminal integration control unit 40 obtains periodically (for example, at intervals of 1 second), as the line state of each radio communication line, the link state (connected/disconnected), RSSI, CINR, an operation frequency, and a connection target radio network identifier from the MS 20 to 22 in the following manner.

Acquire the line state of the private radio line A from the MS 20 via the line termination function part 403.
Acquire the line state of the private radio line B from the MS 21 via the line termination function part 404.
Acquire the line state of the public radio line from the MS 22 via the line termination function part 405.

In this case, the line termination function parts 403 to 405 add the information on the number of transmitted/received packets, the amount of transmitted/received data, and the transmission delay time, which are measured by them, to the information on the line states obtained from the MS 20 to 22, and report the information to the communication state management function part 401.

The communication state management function part 401 uses the tunnels 70 to 72 constructed by the line termination function parts 403 to 405 to report the line state of each radio communication line to the communication state management function part 301 of the regulation station 30 periodically (for example, at intervals of 1 second).

The communication status management function part 301 of the regulation station 30 obtains periodically (for example, at intervals of 1 second), as the line state of each radio communication line, the link state (connected/disconnected), RSSI, CINR, an operation status, and a radio network identifier from the BS 10 to 12 in the following manner.

Acquire the line state of the private radio line A from BS 10 via the line termination function part 303.
Acquire the line state of the private radio line B from BS 11 via the line termination function part 304.
Acquire the line state of the public radio line from the BS 12 via the line termination function part 305.

In this case, the line termination function parts 303 to 305 add information on the number of sent/received packets, the amount of sent/received data, and the transmission delay time, which are measured by them, to the information on the line states obtained from the BS 10 to 12, and report the information to the communication state management function part 301.

When a plurality of unmanned movable bodies exist in the system, the communication state management function part 301 uses an identifier (for example, a MAC address) corresponding to each of the unmanned movable bodies to identify the unmanned movable body and obtain the line state with the MS mounted on each unmanned movable body.

Due to the above processes, the communication state management function part 301 recognizes the bidirectional line states in the three radio communication lines of the private radio line A, the private radio line B, and the public radio line. Further, the ratio of packets whose transmission has failed (packet loss rate) can also be calculated based on the number of bidirectional transmission/reception packets recognized by the communication state management function part 301. Here, in the obtained bidirectional channel states, the direction from the BS toward the MS is referred to as "downlink" and the direction from the MS toward the BS is referred to as "uplink". For example, the transmission direction is applied to the item of each line state such that the RSSI measured by the BS is referred to as "uplink RSSI" and the RSSI measured by the MS is referred to as "downlink RSSI".

(Communication Path Between Terminal Integrated Control Unit 40 and Operation Instruction Equipment 60)

Hereinafter, the communication path between the data communication application 406 of the terminal integrated control unit 40 and the operation instruction equipment 60 will be described with reference to FIG.

The communication data from the data communication application 406 of the terminal integration control unit 40 to the operation instruction equipment 60 is sent to three communication paths of the tunnels 70 to 72 by the packet transfer control function part 402. The communication data is integrated by the packet transfer control function part 302 of the regulation station 30 and then reach the operation instruction equipment 60 via the interface part 306 and the Internet section 50.

The communication data from the operation instruction equipment 60 to the data communication application 406 of the terminal integrated control unit 40 reaches the interface part 306 of the regulation station 30 via the Internet section 50, and then is sent to the three communication paths of the tunnels 70 to 72 by the packet transfer control function part 302. The communication data is integrated by the packet transfer control function part 402 of the terminal integration control unit 40 and then reach the data communication application 406.

Due to the above process, when the data communication is performed between the terminal integrated control unit 40 and the operation instruction equipment 60, it is always configured to go through the regulation station 30. In the present embodiment, the route diversity transmission is applied to the section between the packet transfer control function part 302 of the regulation station 30 and the packet transfer control function part 402 of the terminal integrated control unit 40.

(Quality Determination of Line State)

Hereinafter, a case in which the communication state management function part 301 of the regulation station 30 determines the quality of the line state of each radio communication line connected to the unmanned movable body M will be described.

The communication state management function part 301 determines whether or not the line state of each radio communication line satisfies the desired quality based on the information on the bidirectional line state of each radio communication line used by the unmanned movable body M and preset quality criteria.

For example, the communication state management function part 301 manage the following line states and quality determination criteria.

<Private Radio Line A>
link state=connected
BS 10 upstream RSSI=−60 dBm
BS 10 upstream CINR=+30 dB
MS 20 downstream RSSI=−59 dBm
MS 20 downstream CINR=+25 dB
Upstream packet loss rate=0'
Downstream packet loss rate=5
Upstream transmission delay time=50 ms
Downstream transmission delay time=70 ms
<Private Radio Line B>
link state=disconnected
BS 11 upstream RSSI=no information
BS 11 upstream CINR=no information
MS 21 downstream RSSI=no information
MS 21 downstream CINR=no information
Upstream packet loss rate=no information
Downstream packet loss rate=no information
Uplink transmission delay time=no information
Downstream transmission delay time=no information
<Public Radio Line>
link state=connected
BS 12 upstream RSSI=−65 dBm
BS 12 upstream CINR=+25 dB
MS 22 downstream RSSI=−65 dBm
MS 22 downstream CINR=+25 dB
Upstream packet loss rate=30%
Downstream packet loss rate=0%
Upstream transmission delay time=300 ms
Downstream transmission delay time=50 ms <Quality Determination Criteria>

TABLE 1

| Determination result | Determination criteria (example) |
|---|---|
| quality "satisfactory" | "link state = connected," and the following conditions are satisfied. "downstream CINR ≥ 15 dB" "downstream packet loss < 10%" "downstream transmission delay time ≤ 100 ms" "upstream CINR ≥ 25 dB" "upstream packet loss < 10%" "upstream transmission delay time ≤ 200 ms" |
| quality "unsatisfactory" | "link state = connected," but any one of the conditions is not satisfied. |
| quality "disconnected" | "link state = disconnected" |

The following is description of the results of the quality determination of the line states of the radio communication lines related to the unmanned movable body M, which is performed by the communication state management function part 301.

Private radio line A: quality "satisfactory"
Private Radio Line B: quality "disconnected"
Public radio line: quality "unsatisfactory"

Hereinafter, an example of communication control performed when two unmanned movable bodies M1 and M2 are flying in the same airspace will be described with reference to FIG. 5. In this case, the unmanned movable bodies M1 and M2 flying in the same airspace can be recognized as a group sharing the same frequency resource. Whether or not the unmanned movable bodies M1 and M2 belong to the same group can be determined based on the connection target radio network identifiers, for example. In other words, when the connection target radio network identifiers of the unmanned movable bodies are the same, it is determined that these unmanned movable bodies belong to the same group. Another method may be used to determine groups of unmanned movable bodies. For example, when an unmanned movable body has a global positioning system (GPS) function, groups of unmanned movable bodies can be determined based on the position information of the unmanned movable bodies obtained by the GPS function. In other words, it is possible to specify frequency resources (radio communication lines) that can be used by unmanned movable bodies based on the position information of unmanned movable bodies, and determine that a plurality of unmanned movable bodies using the same frequency resources belong to the same group.

Figure 5:
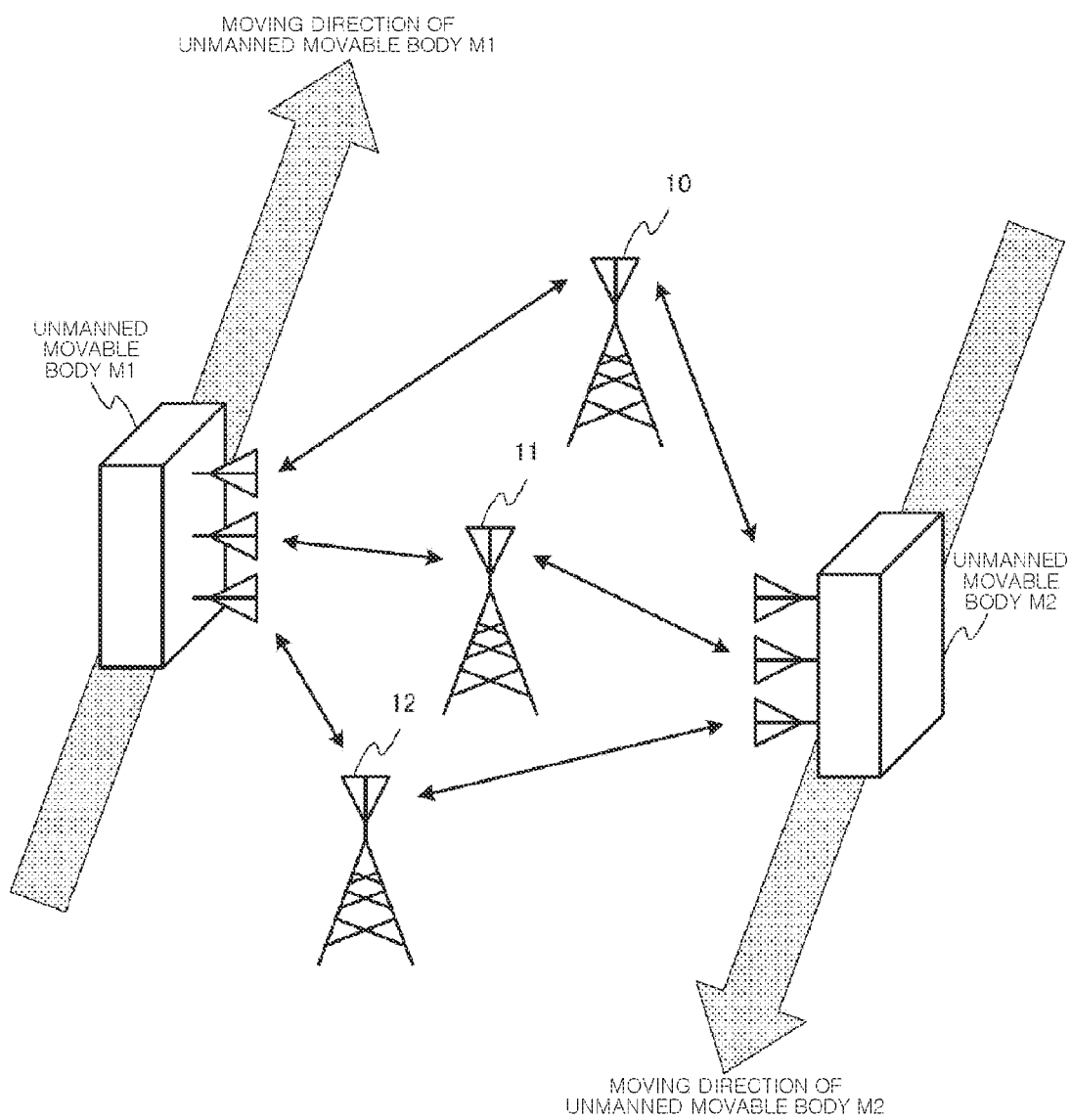
FIG. 5 shows an example of communication control performed when two unmanned movable bodies are flying in the same airspace.

FIG. 5 shows an example in which two unmanned movable bodies M1 and M2 pass each other. When the flight points of two aircrafts are close to each other, it is considered that the basic radio wave environments are similar to each other. However, even if they are connected to the same base station, the result of the quality determination of the line state may be different in the following situation. The following situation is merely examples, and the results of the quality determination of the line state may vary depending on various circumstances.

when the unmanned movable bodies M1 and M2 enter into a contract with the telecommunications provider (the operator of the public radio line) at different rates.
when the functions (generally, defined as terminal device capability or terminal category classification in radio communication standards) of the mobile station equipment installed in the unmanned movable bodies M1 and M2 are different.

Here, for example, it is assumed that the quality determination of the line states of the unmanned movable bodies M1 and M2 has the following results.

<Results of Quality Determination of Line States of Unmanned Movable Body M1>
  Private radio line A: quality "satisfactory"
  Private radio line B: quality "unsatisfactory"
  Public radio line: quality "satisfactory"
<Results of Quality Determination of Line States of Unmanned Movable Body M2>
  Private radio line A: quality "satisfactory"
  Private radio line B: quality "unsatisfactory"
  Public radio line: quality "unsatisfactory"

In the above example, the quality of the private radio lines B is determined to be "unsatisfactory" in both the unmanned movable body M1 and the unmanned movable body M2. Here, for example, although the uplink/downlink CINR of the private radio line B is higher than the threshold in both movable bodies, the quality is determined to be "unsatisfactory" due to the high uplink or downlink packet loss rate. In this case, the quality is determined to be "unsatisfactory" not because the quality of the radio signal (radio waves) is poor, but because the unmanned movable bodies M1 and M2 are connected to the same base station BS11. In other words, it is predicted that the frequency resources are insufficient due to a large number of unmanned movable bodies connected to the same base station and, thus, it is difficult to obtain the required packet communication speed.

Under the above prediction, the communication state management function part 301 of the regulation station 30 performs the following control while considering that the unmanned movable body M1 can secure two radio communication lines (private radio line A and public radio line) having "satisfactory" quality. In other words, in order to improve the quality of the private radio line B of the unmanned movable body M2, the communication control (issue of an instruction to the unmanned movable body M1) for disconnecting the connection with the private radio line B is performed for the unmanned movable body M1. In other words, a control signal of instructing disconnection of the private radio line B is transmitted to the unmanned movable body M1. After the connection between the unmanned movable body M1 and the private radio line B is disconnected, the quality of the line state is determined again.

As a result, as will be described below, it is determined that the communication control is successful when both the unmanned movable body M1 and the unmanned movable body M2 can secure two radio communication lines whose quality is determined to be "satisfactory".

<Results of Quality Determination of Line States of Unmanned Movable Body M1>
  Private radio line A: quality "satisfactory"
  Private Radio Line B: quality "disconnected"
  Public radio line: quality "satisfactory"
<Results of Quality Determination of Line States of Unmanned Movable Body M2>
  Private radio line A: quality "satisfactory"
  Private Radio Line B: quality "satisfactory"
  Public radio line: quality "unsatisfactory"

The communication state management function part 301 of the regulation station 30 uses the connection target radio network identifiers of a plurality of unmanned movable bodies constituting the system to recognize the groups of the unmanned movable bodies sharing the same frequency resources. Further, the communication state management function part 301 of the regulation station 30 specifies the frequency channel to be used by each of the unmanned movable bodies to ensure that the frequency resources to be used by the unmanned movable bodies are not concentrated, based on the types of the radio communication devices mounted on the unmanned movable bodies belonging to the same group or the information on the line state of the radio communication line. In other words, the communication control is performed such that the resource allocation that integrates a plurality of radio systems is realized beyond the resource allocation within the radio system by a single operator. Accordingly, the concentrated usage of the same frequency resources can be avoided, which makes it possible to improve the communication quality of the entire mobile stations constituting the system.

In the above-described communication control, there may be various criteria for dealing with the private radio line B or determining whether or not the communication control is successful. For example, instead of instructing the unmanned movable body M1 to disconnect the connection with the private radio line B, it is possible to instruct the unmanned movable body M1 to change the connection to the base station operating on a different frequency channel. Further, the criteria for the number of radio communication lines determined to have satisfactory line quality that should be secured may be changed depending on whether each radio station is operated as an unlicensed station or as a licensed station. For example, since the reliability of a radio system operating in a frequency band that should allow interference from others is insufficient, one additional line needs be secured in addition to the radio system. However, if it is connected to a radio system with a low possibility of causing interference due to operational adjustment or the like, the control may be performed such that only one line is allowed.

SUMMARY

As described above, the radio communication system of this example includes the plurality of unmanned movable bodies M1 and M2 capable of performing/supporting the route diversity transmission using a plurality of radio communication lines for data transmission, and the regulation station 30 that collects the line states of the radio communication lines. The regulation station 30 transmits a control signal of the radio communication line to a particular unmanned movable body (for example, the unmanned movable body M1) so as to increase the number of unmanned movable bodies in which the number of radio communication lines whose line states satisfy quality determination criteria is greater than or equal to a predetermined value (for example, two lines) based on the line states of the radio communication lines collected for the plurality of movable bodies.

Here, the particular unmanned movable body may be an unmanned movable body using the same radio communication line as an unmanned movable body in which the number of radio communication lines whose line states satisfy the quality determination criteria is smaller than a predetermined value among the unmanned movable bodies in which the number of radio communication lines whose lines states satisfy the quality determination criteria exceeds a predetermined value.

The control signal to be transmitted to the particular unmanned movable body may be, e.g., a control signal that instructs disconnection of a radio communication line whose line state does not satisfy the quality determination criteria. This control signal can be understood as a signal that instructs an unmanned movable body having another satisfactory radio communication line to disconnect the connection with a congested radio network and to allocate radio resources to another unmanned movable body.

In addition, as a other example of the control signal to be transmitted to the particular unmanned movable body, the control may be, e.g., a control signal that instructs a change of a connection target base station for at least one of radio communication lines whose line state satisfies the quality determination criteria. This control signal can be understood as a signal that instructs an unmanned movable body having another satisfactory radio communication line to move to a channel where the radio wave environment is poor but the communication can be performed.

With the above configuration, in a radio communication system using a route diversity transmission technology, even when a plurality of movable bodies exist in the same area, a large number of movable bodies can perform efficient and highly reliable radio communication.

Here, the unmanned movable body M is an example of a movable body according to the present disclosure, and the regulation station 30 is an example of an integrated controller according to the present disclosure. The central controller may be a device connected to base stations of a plurality of radio communication lines via a network, and may be provided in an ultimate communication target (in this example, the operation instruction equipment 60) of a movable body. Further, a movable body on which a person can board may be used, for example, instead of the unmanned movable body M.

While the present disclosure has been described based on one embodiment, the present disclosure is not limited to the radio communication system described herein, and can be widely applied to other radio communication systems.

Further, the present disclosure can be provided as a method including technical procedures related to the above processing, a program for causing a processor to execute the above processing, a storage medium storing such a program in a computer-readable manner, or the like.

The scope of the present disclosure is not limited to the illustrated and described exemplary embodiments, but also includes all embodiments that provide effects equivalent to those intended by the present disclosure. Moreover, the scope of the present disclosure may be defined by any desired combination of specific features of each and every disclosed features.

INDUSTRIAL APPLICABILITY

The present disclosure can be used in a radio communication system capable of simultaneously operating a plurality of movable bodies capable of performing/supporting route diversity transmission using a plurality of radio communication lines for data transmission.

DESCRIPTION OF REFERENCE NUMERALS

M: unmanned movable body, 10 to 12: base station, 20 and 21: mobile station, 30: regulation station, 40: terminal integrated control unit, 50: Internet section, 60: operation instruction equipment, 70 to 73: tunnel, 101 and 201: antenna, 102 and 202: data transmission part, 103 and 203: main controller, 104 and 204: interface part, 105 and 205: terminal, 111 and 211: RF part, 112 and 212: BB signal processing part, 113 and 213: MAC processing part, 121 and 221: transmission BB part, 122 and 222: reception BB part, 131 and 231: channel encoding part, 132 and 232: modulation part, 141 and 241: demodulation part, 142 and 242: channel decoding part, 143 and 243: line quality measurement part, 301 and 401: communication state management function part, 302 and 402: packet transmission control function part, 303 to 305 and 403 to 405: line termination function part, 306: interface part, 406: data communication application

The invention claimed is:

1. A radio communication system comprising:
a plurality of movable bodies that support route diversity transmission using a plurality of radio communication lines for data transmission; and
an integration controller configured to collect line states of the radio communication lines for each of the plurality of movable bodies,
wherein the integration controller is configured to transmit a control signal of the radio communication line to a particular one of the movable bodies so as to increase a number of the movable bodies in which a number of the radio communication lines whose line states satisfy a quality determination criterion is greater than or equal to a predetermined value, based on the line states of the radio communication lines collected for each of the plurality of movable bodies, and
the particular one of the movable bodies is a movable body using a same radio communication line as another of the movable bodies, in which the number of radio communication lines whose line states satisfy the quality determination criterion is smaller than the predetermined value, among the movable bodies in which the number of radio communication lines whose line states satisfy the quality determination criterion exceeds the predetermined value.

2. The radio communication system of claim 1, wherein the integration controller is configured to transmit a control signal that instructs disconnection of a radio communication line whose line state does not satisfy the quality determination criterion to the particular one of the movable bodies.

3. The radio communication system of claim 2, wherein the integration controller is configured to transmit a control signal that instructs a change of a connection target base station for at least one of the radio communication lines whose line states satisfy the quality determination criterion to the particular one of the movable bodies.

4. The radio communication system of claim 1, wherein the integration controller is configured to transmit a control signal that instructs a change of a connection target base station for at least one of the radio communication lines whose line states satisfy the quality determination criterion to the particular one of the movable bodies.

* * * * *